United States Patent
Benakli et al.

(10) Patent No.: US 6,807,025 B1
(45) Date of Patent: Oct. 19, 2004

(54) MAGNETIC RECORDING PROCESS

(75) Inventors: Mourad Benakli, Shrewsbury, MA (US); Adam Torabi, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 106 days.

(21) Appl. No.: 10/027,221

(22) Filed: Dec. 21, 2001

(51) Int. Cl.$^7$ .............................. G11B 5/03; G11B 5/86
(52) U.S. Cl. .............................. 360/66; 360/16; 360/17
(58) Field of Search .......................... 360/66, 55, 131, 360/132, 16, 17; 428/694, 156, 409

(56) References Cited

U.S. PATENT DOCUMENTS

| | | | |
|---|---|---|---|
| 4,959,820 A | * | 9/1990 | Horimai et al. ............... 360/59 |
| 5,367,508 A | * | 11/1994 | Haba ....................... 369/13.17 |
| 6,088,181 A | * | 7/2000 | Tanaka ........................ 360/66 |
| 6,347,016 B1 | * | 2/2002 | Ishida et al. ................... 360/17 |
| 6,433,944 B1 | * | 8/2002 | Nagao et al. .................. 360/16 |
| 6,469,848 B1 | * | 10/2002 | Hamada et al. ............... 360/16 |
| 6,545,848 B1 | * | 4/2003 | Terunuma .............. 360/324.12 |
| 2001/0024342 A1 | * | 9/2001 | Mitani et al. ................ 360/127 |

* cited by examiner

*Primary Examiner*—David Hudspeth
*Assistant Examiner*—Glenda P Rodriguez
(74) *Attorney, Agent, or Firm*—Cesari and McKenna, LLP (57) ABSTRACT

A magnetic recording process includes applying an initial magnetic field to magnetize a magnetic recording medium and positioning a ferromagnetic mask over the magnetic recording medium. The ferromagnetic mask has a tooth which shields a portion of the magnetic recording medium in order to maintain the initial magnetic field in the portion. The process also includes applying a biasing magnetic field to the magnetic recording medium and applying a recording magnetic field to the magnetic recording medium while applying the biasing magnetic field. The biasing magnetic field is substantially perpendicular to the initial magnetic field and the recording magnetic field is substantially opposite in polarity to the initial magnetic field.

35 Claims, 6 Drawing Sheets

MAGNETIC RECORDING PROCESS

CROSS-REFERENCE TO RELATED APPLICATION

This application is a continuation-in-part (and claims the benefit of priority under 35 U.S.C. §120) of U.S. patent application Ser. No. 10/022,566, filed on Dec. 14, 2001, now abandoned.

TECHNICAL FIELD

This invention relates a process for recording information onto a magnetic recording medium.

BACKGROUND

Figure 1:
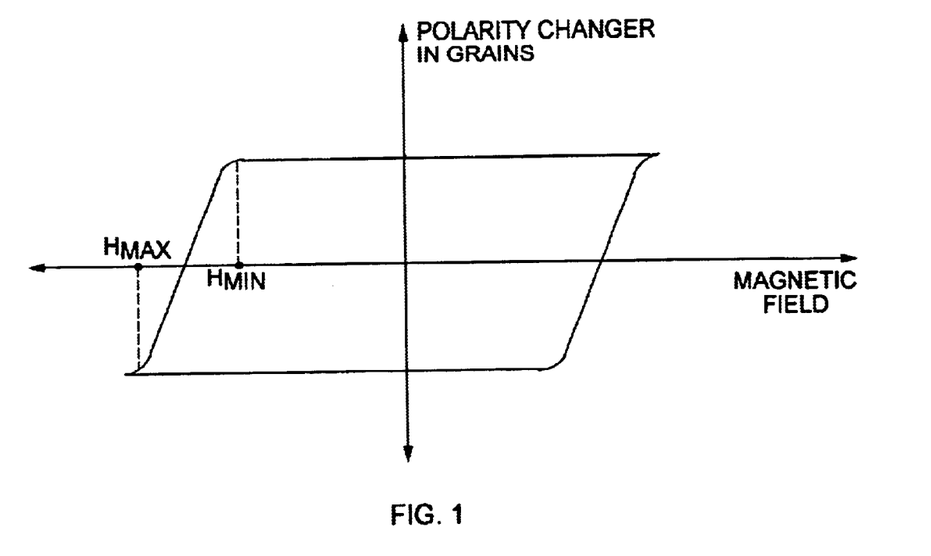
FIG. 1 is a graph showing a hysteresis curve for a magnetic recording medium.

A magnetic medium contains magnetic particles that can be polarized by application of a magnetic field. The magnetic medium is characterized by a hysteresis curve, which specifies the magnitudes of magnetic fields needed to change the polarization of the magnetic particles. For example, in the hysteresis curve shown in FIG. 1, a magnetic field above $H_{max}$ will result in a change in polarization of most all magnetic particles in the medium. A magnetic field having a magnitude below $H_{min}$ will cause virtually no change in polarization.

Information, such as a servo pattern, is recorded onto a magnetic recording medium by placing a mask (having a magnetic shield value of $\Delta H$) over the medium and applying a magnetic field, $H_a$. The medium is then re-magnetized such that portions of the medium covered by the mask retain their original polarity and portions of the medium that are not covered by the mask obtain a new polarity.

To reduce the occurrences of spurious subpulses, i.e., regions of improper polarity, on the recording medium, the following two conditions should be met:

$H_a - \Delta H < H_{min}$, for regions covered by the mask, and $H_a + \Delta H > H_{max}$, for regions uncovered by the mask.

That is, for covered regions (i.e., regions covered by the mask), the difference between the applied magnetic field and the magnetic shield of the mask should be less than $H_{min}$ on the hysteresis curve, resulting in few, if any, changes in polarity in those regions. For uncovered regions (i.e., regions not covered by the mask), the sum of the applied magnetic field and the magnetic shield of the mask should be greater than $H_{max}$ on the hysteresis curve, resulting in substantial, if not total, changes in polarity.

SUMMARY

In general, in one aspect, the invention is directed to a method for use in recording information on a medium. The method includes applying a first magnetic field to the medium, applying a second magnetic field to the medium, the second magnetic field being substantially perpendicular to the first magnetic field, and applying a third magnetic field to the medium, the third magnetic field being substantially opposite in polarity to the first magnetic field. By applying magnetic fields in this manner, it is possible to re-orient magnetic grains on the recording medium and thereby reduce the magnetic field needed to record information onto the medium.

This aspect may include one or more of the following features. The first magnetic field may orient magnetic grains in the medium towards a first direction. The second magnetic field may orient the magnetic grains towards a second direction that is perpendicular to the first direction. The third magnetic field may orient the magnetic grains towards a third direction that is opposite to the first direction. The first direction may be an X direction in a three-dimensional Cartesian XYZ coordinate system. The second direction may be a Z direction in the three-dimensional Cartesian XYZ coordinate system. The third direction may be a -X direction in the three-dimensional Cartesian XYZ coordinate system.

The second magnetic field may have sufficient strength to orient at least some of the magnetic grains at least 10° towards the Z direction. The second magnetic field may have sufficient strength to orient a majority of the magnetic grains to 45°±10° towards the Z direction.

The method may include positioning a mask over the medium. The mask may have a tooth that shields a portion of the medium underneath the tooth in order to maintain the first magnetic field in the portion underneath the tooth. The information may include a servo pattern to be recorded on the medium and the tooth may define a portion of the servo pattern. The mask may be made of a ferromagnetic material, such as cobalt, having teeth that define a servo pattern to be recorded on the medium. Applying the second magnetic field may change a squareness of the medium.

In general, in another aspect, the invention is directed to a magnetic recording process that includes applying an initial magnetic field to magnetize a magnetic recording medium and positioning a ferromagnetic mask over the magnetic recording medium. The ferromagnetic mask may have a tooth that shields a portion of the magnetic recording medium in order to maintain the initial magnetic field in the portion. The method also includes applying a biasing magnetic field to the magnetic recording medium, the biasing magnetic field being substantially perpendicular to the initial magnetic field, and applying a recording magnetic field to the magnetic recording medium while applying the biasing magnetic field, the recording magnetic field being substantially opposite in polarity to the initial magnetic field.

This aspect may include one or more of the following features. The initial magnetic field may cause magnetic grains in the magnetic recording medium to orient towards a first direction. The recording magnetic field may cause magnetic grains in the magnetic recording medium that are not located underneath the tooth to orient towards a second direction that is different from the first direction. The second direction may have a directional component that is opposite to a directional component the first direction. Orienting the magnetic grains in the second direction may include recording information on the magnetic recording medium. Applying the biasing magnetic field may cause magnetic grains in the magnetic recording medium to orient towards a direction that is perpendicular to a direction of the initial magnetic field and the recording magnetic field.

The initial magnetic field may orient magnetic grains in the magnetic recording medium towards an X direction in a three-dimensional Cartesian XYZ coordinate system. The biasing magnetic field may orient magnetic grains in the magnetic recording medium towards a Z direction in the three-dimensional Cartesian XYZ coordinate system. The recording magnetic field may orient magnetic grains in the magnetic recording medium towards a -X direction in the three-dimensional Cartesian XYZ coordinate system.

The biasing magnetic field may have sufficient strength to orient at least some of the magnetic grains to at least 10° towards the Z direction. The biasing magnetic field may have sufficient strength to orient a majority of the magnetic grains to 45°±10° towards the Z direction.

The ferromagnetic mask may define a servo pattern to be recorded on the magnetic recording medium and the tooth may define a portion of the servo pattern. The mask may include plural teeth that define a servo pattern to be recorded onto the magnetic recording medium. The ferromagnetic material may include cobalt. Applying the biasing magnetic field may change a squareness of the magnetic recording medium.

In general, in another aspect, the invention is directed to a disk drive that includes a disk having a plurality of concentric tracks which store data and a print head which transfers data to and from the concentric tracks of the disk. The disk also includes servo information that is applied to the disk by applying a first magnetic field to the disk, applying a second magnetic field to the disk, the second magnetic field being substantially perpendicular to the first magnetic field, and applying a third magnetic field to the disk, the third magnetic field being substantially opposite in polarity to the first magnetic field.

This summary has been provided so that the nature of the invention can be understood quickly. A description of illustrative embodiments of the invention is set forth below.

DESCRIPTION OF DRAWINGS

Like reference numerals in different figures indicate like elements.

DETAILED DESCRIPTION

Figure 2:
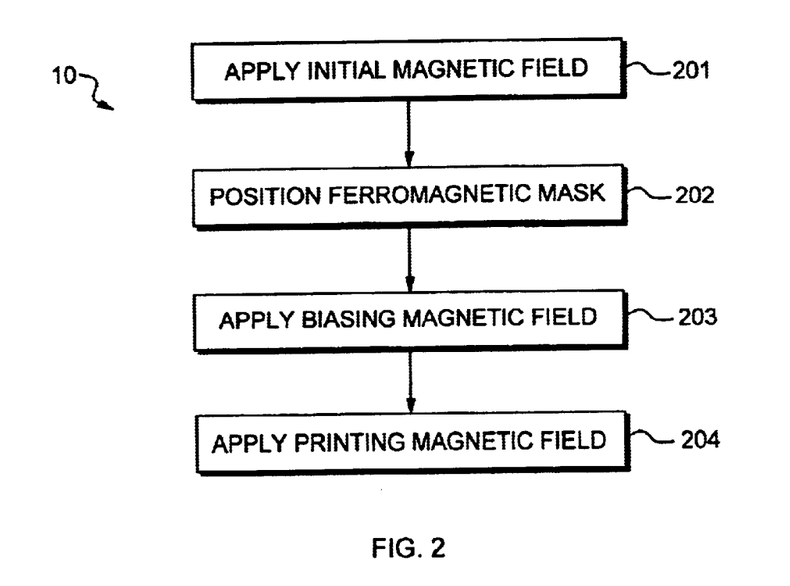
FIG. 2 a flowchart showing a magnetic recording process.

Referring to FIG. 2, a process 10 is shown for recording information onto a magnetic recording medium. Process 10 may be implemented using standard recording equipment, including a computer to control the process.

Figure 3:
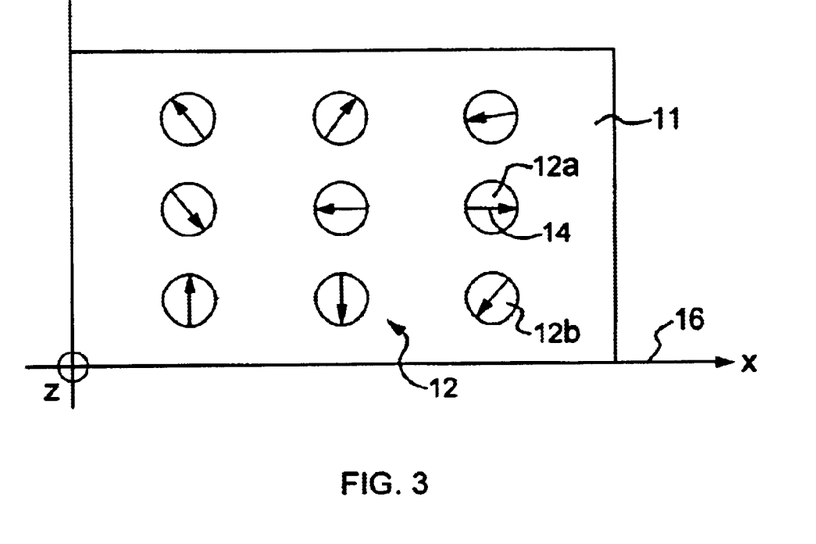
FIGS. 3, 5 and 13 show polarities of magnetic grains on the magnetic recording medium.

Process 10 will be described with respect to the magnetic recording medium 11 shown in FIG. 3. Magnetic recording medium 11 may be any type of medium, such as tape or a disk, that is capable of storing data using a magnetic field. As shown in FIG. 3, magnetic recording medium 11 is comprised of magnetic grains 12. Prior to application of an external magnetic field, magnetic grains 12 are randomly polarized, i.e., they do not point generally towards a single direction. The direction of polarization is indicated by the arrows disposed along the axes of magnetic grains 12.

In this regard, each magnetic grain includes an "easy axis", such as easy axis 14 of grain 12a. In this context, the easy axis of a magnetic grain is an axis on which the poles of the grain lie naturally. The easy axes of the magnetic grains in a recording medium generally lie along the same plane. In the description that follows, this plane is defined to be the Cartesian XY plane, as shown in FIG. 3. That is, the X and Y directions are the horizontal and vertical, respectively, along the recording medium and the Z direction, where applicable, is pointing "out of" and "into" the page on the plane of FIG. 3.

Figure 4:
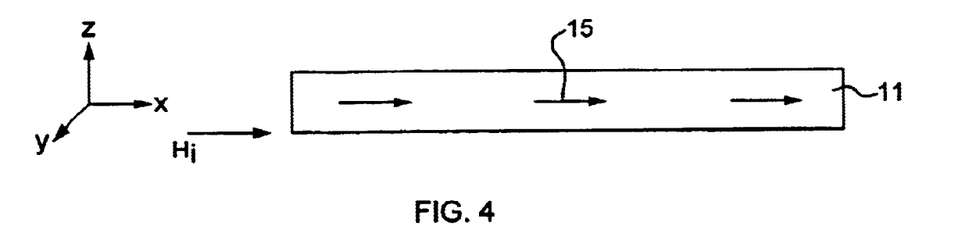
FIGS. 4, 6, 8, 11 and 14 are side views of a magnetic recording medium being subjected to the process of FIG. 2.

At the start of process 10, magnetic recording medium 11 is polarized so that its magnetic grains are oriented generally towards the same direction. Referring to FIG. 4, polarization is achieved by applying (201) an initial magnetic field 15, $H_i$, to magnetic recording medium 11. The direction of the initial magnetic field $H_i$ is shown by the arrows. In this example, the direction of $H_i$ is +X, as shown.

Figure 5:
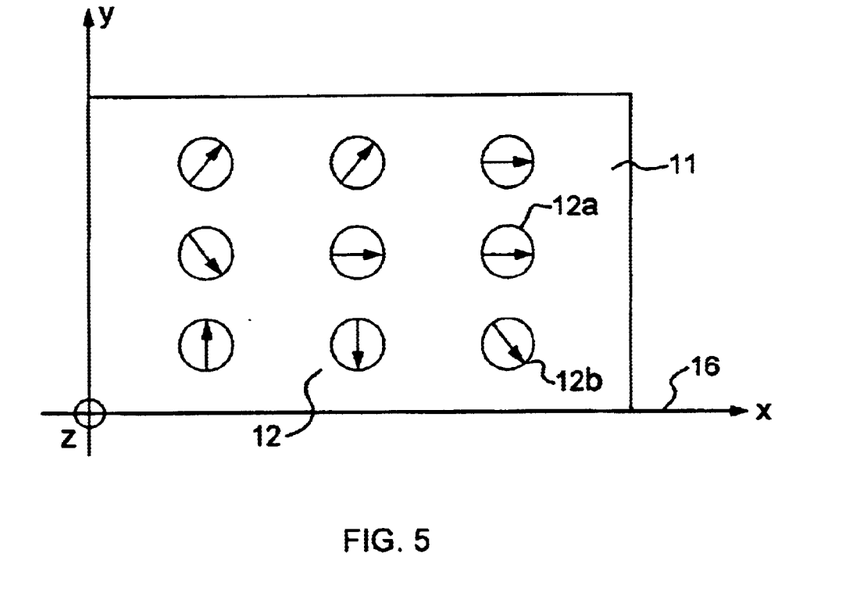

Polarization, in this context, does not mean that all of the magnetic grains are polarized in exactly the same manner, i.e., that all the arrows point in exactly the same direction. Rather, as shown in FIG. 5, the magnetic grains 12 remain generally polarized along their easy axes. However, the polarizations are such that the poles of each grain, except for those grains having easy axes solely in the Y direction, are oriented in the same direction. For example, the arrows in FIG. 5 defining the grains polarities have a +X component (except for those that lie in the Y-direction only), meaning that the grains are polarized in generally the same direction (the direction of $H_i$). By way of example, refer to magnetic grain 12b. The easy axis of magnetic grain 12b is angled roughly 45° relative to X-axis 16. The polarity of magnetic grain 12b is switched so that the grain points generally in the +X direction.

Referring to FIG. 4, following application of the initial magnetic field, $H_i$, recording medium 11 is polarized in the direction shown by the arrows. A ferromagnetic mask 17 (FIG. 6) is then positioned (202) over the magnetized recording medium 11. Ferromagnetic mask 17 may be a cobalt-based mask that acts as a magnetic shield for magnetized recording medium 11. Ferromagnetic materials other than cobalt may be included in, or used for, the mask.

Figure 6:
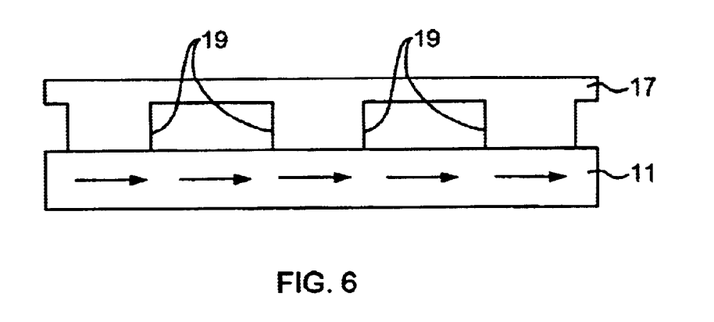

Ferromagnetic mask 17 has a magnetic shield value of ΔH. Ferromagnetic mask 17 prevents a change in polarity of portions of recording medium 11 underneath mask 17 (i.e., covered by mask 17) up to a value of ΔH. In this embodiment, ferromagnetic mask 17 is comprised of teeth 19 that come into contact with recording medium 11. The teeth provide the shielding ΔH in areas of contact with recording medium 11.

Figure 7:
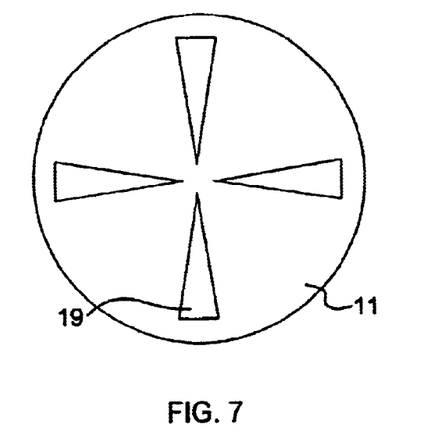
FIG. 7 is a top view of teeth in a mask used in the process of FIG. 2.

In this embodiment, the teeth 19 are arranged on ferromagnetic mask 17 to define a servo pattern (FIG. 7) to be recorded onto recording medium 11. A servo pattern is used during magnetic recording to keep track of, and re-position (if necessary), a recording head on the recording medium. During recording, the teeth shield portions of recording medium 11 that they cover, thereby preventing those portions from being re-polarized and maintaining the initial magnetic field, $H_i$, in the portions. The uncovered (unshielded) portions of recording medium 11 are re-polarized during recording. The re-polarized portions comprise the servo pattern on the recording medium.

Figure 8:
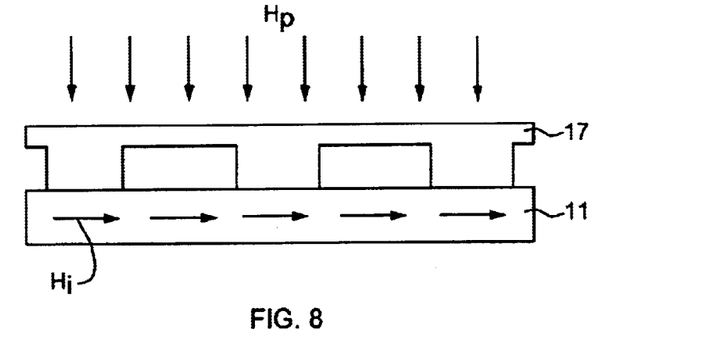
Figure 9:
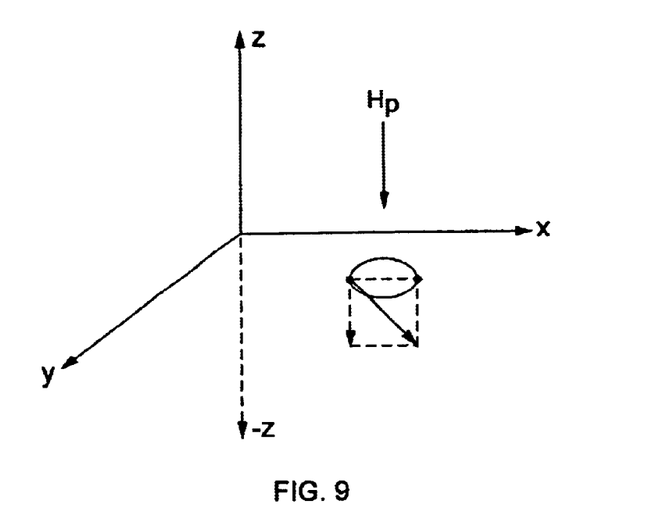
FIGS. 9 and 10 show the effect of a perpendicular magnetic field on a magnetic grain in the magnetic recording medium.

Referring to FIG. 8, a biasing magnetic field, $H_p$, is applied (203) to recording medium 11 (with mask 17 still in place over recording medium 11). Biasing magnetic field $H_p$ is substantially perpendicular to the initial magnetic field $H_i$. Referring to FIG. 9, biasing magnetic field $H_p$ is in a Z direction in Cartesian XYZ space, the −Z direction to be specific. It is noted that $H_p$ and $H_i$ need not be exactly perpendicular, but should contain at least perpendicular components sufficient to orient the magnetic grains in the +Z direction (depending on the direction of the $H_p$ field).

Figure 10:
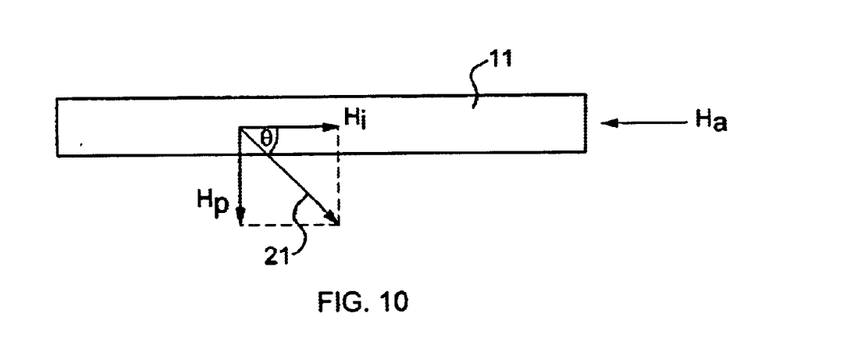

Applying the biasing magnetic field orients the magnetic grains in recording medium 11 towards a Z (in this case, −Z)

direction. This is depicted in FIGS. 9 and 10. More specifically, as shown in FIG. 10, the easy axis of magnetic grain 12a lies in the XY plane. Applying a Z-direction biasing magnetic field $H_p$ to magnetic grain 12c causes the easy axis of the grain to tilt downward, such that the easy axis (and thus the magnetic poles of the magnetic grain) is oriented towards the −Z direction. That is, applying $H_i$ and $H_p$ to magnetic grain 12a produces a resultant vector 21 that defines the orientation of the easy axis of magnetic grain 12a and an angle, θ, that defines the amount of orientation of the magnetic grain towards the Z-axis. In one embodiment, biasing magnetic field $H_p$ has sufficient strength to orient at least some of the magnetic grains in a recording medium at least 10° (i.e., θ in FIG. 10) towards the Z direction. In another embodiment, biasing magnetic field $H_p$ has sufficient strength to orient a majority of the magnetic grains in the recording medium to 45°±10° towards the Z direction.

Figure 11:
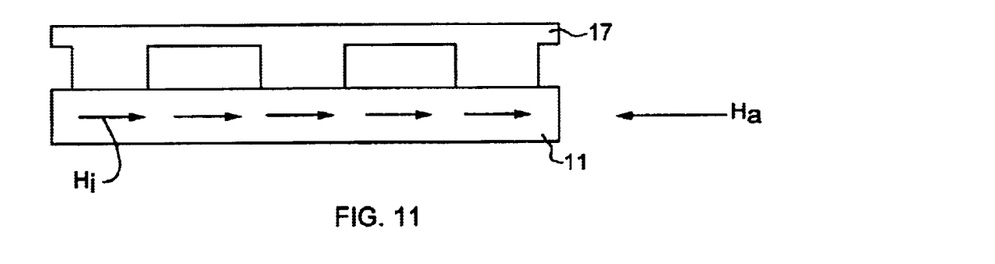

Information is recorded onto recording medium 11 by applying (204) a recording magnetic field $H_a$ to the medium. Referring to FIG. 11, the recording (applied) magnetic field, $H_a$, is opposite in direction to the initial magnetic filed, $H_i$. $H_a$ is of a sufficient magnitude to change the polarity of magnetic grains in recording medium 11 that are not covered by ferromagnetic mask 17. In this embodiment, the recording magnetic field is applied while applying the biasing magnetic field. The magnitude of $H_a$ is set so that the following two conditions are met:

$Ha-\Delta H<Hmin$, for regions covered by the mask, and $Ha+\Delta H>Hmax$, for regions uncovered by the mask.

Applying $H_p$ reduces $H_{max}$, thus increasing the squareness of recording medium 11. "Squareness", in this context, refers to the shape of the medium's hysteresis curve. The closer $H_{max}$ and $H_{min}$ are to one another, the more "square" the recording medium defined by the curve is. Since $H_{max}$ is lower following application of $H_p$, lower $H_a$ and $\Delta H$ values can be used for magnetic recording.

Figure 12:
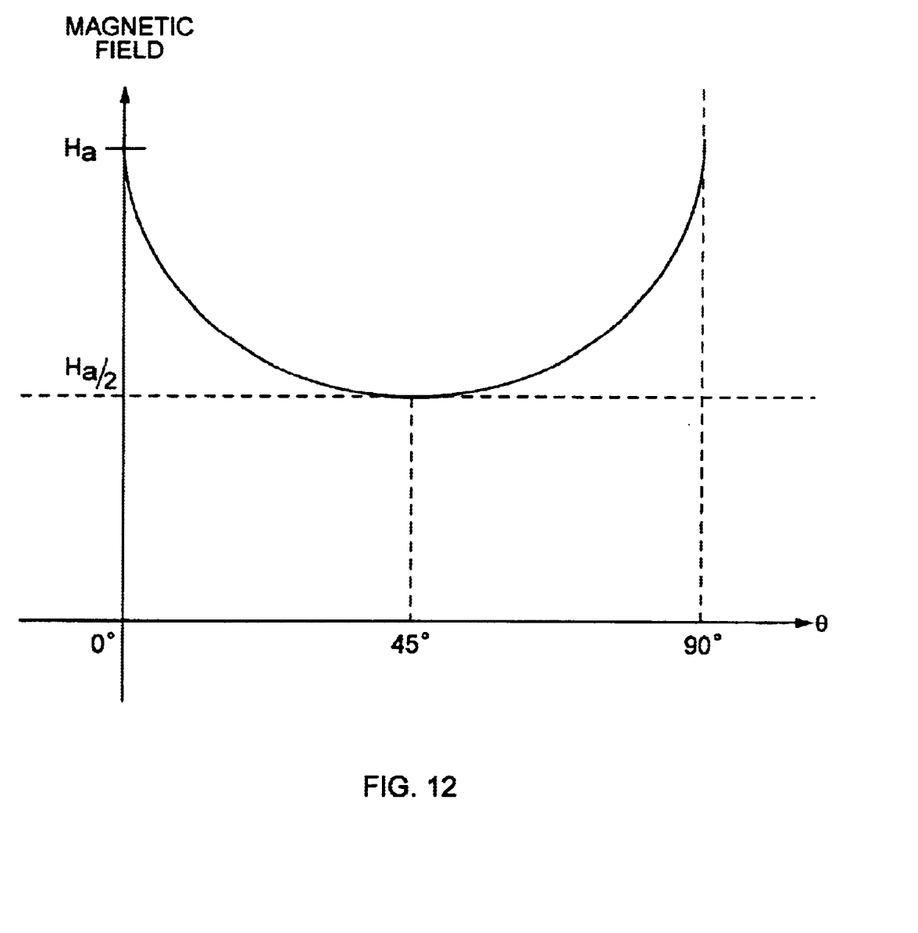
FIG. 12 is a graph showing the effect on a magnetic recording medium of applying the perpendicular magnetic field to the recording medium prior to recording.

In more detail, magnetic grains that are polarized oppositely to $H_a$ are more difficult to switch during printing than magnetic grains that are offset relative to $H_a$. Applying $H_p$ to recording medium 11 offsets the magnetic grains relative to $H_a$. This has the effect of reducing $H_{max}$ for the material (since the offset makes it possible to use a smaller magnetic field to switch the polarity of the magnetic grains). Referring to FIG. 12, by re-orienting the grains by 45° along the Z-direction, the amount of applied magnetic field, $H_a$, required to reverse the polarity of the grains is cut in half. As shown in FIG. 12, increasing the angle, also increases the amount of magnetic field required to reverse the polarity of the grains.

Figure 13:
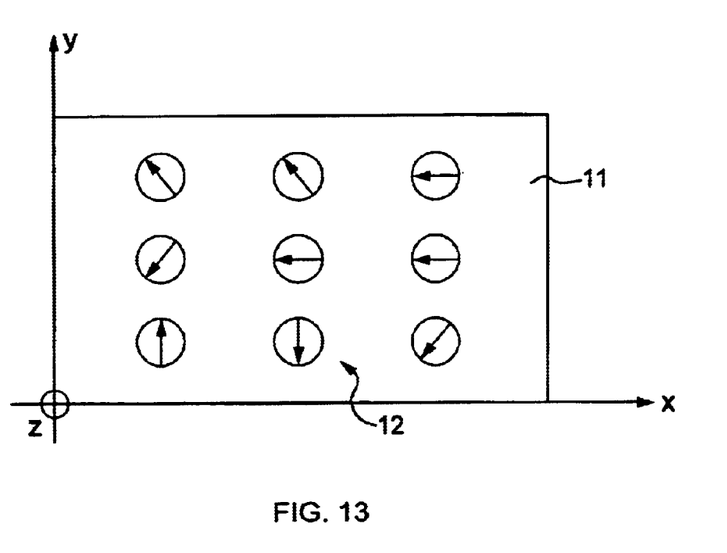
Figure 14:
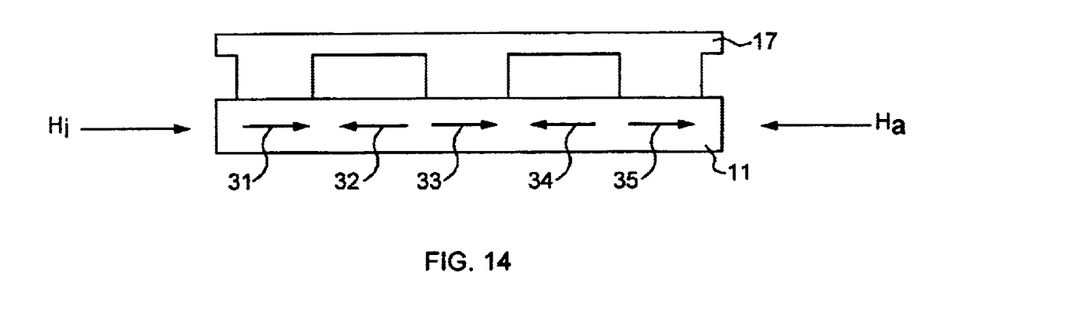

FIG. 13 shows the easy axes of grains 12 following application of Ha (for those portions of the recording medium that are not shielded). FIG. 14 shows the polarities of the various portions 31 to 35 of recording medium 11 following printing. As shown, portions 32 and 34 have the polarity of applied magnetic field $H_a$ and portions 31, 33 and 35 have the polarity of initial magnetic filed $H_i$. Portions 32 and 34 constitute the servo pattern on recording medium 11.

Process 10 can be used to write servo data to a magnetic disk in a disk drive (not shown). The magnetic disk, in general, contains a plurality of concentric tracks for storing digital data and servo spokes for storing servo information. The servo information is stored on the tracks of the disk via, e.g., process 10, in the form of magnetic polarity transitions induced into a magnetic layer covering the disk.

During operation of the disk drive, the disk is rotated about an axis by a spin motor at a substantially constant angular speed. To perform a transfer of data with the disk, a transducer, known as a print (or "recording") head, is centered above a track of the rotating disk. Once centered, the head can be used to transfer data to the track (during a write operation) or to transfer data from the track (during a read operation). During writing, a write current is delivered to the centered head to create an alternating magnetic field (the recording magnetic field noted above) in a lower portion of the head that induces magnetic polarity transitions onto the track. During reading, the centered head senses magnetic fields emanating from the magnetic polarity transitions on the moving track to create an analog read signal representative of the data thereon.

The invention is not limited to the specific embodiments described above. For example, the invention is not limited to recording servo patterns or to recording the servo patterns onto disks or tape. The invention is not limited to using a ferromagnetic mask. Any type of mask that will provide a magnetic shield can be used. The invention is not limited to the specific geometries and/or to the directions of the magnetic fields described herein. These may be varied so long as their counterparts are varied correspondingly in accordance with the teachings set forth herein.

Other embodiments not described herein are also within the scope of the following claims.

What is claimed is:

1. A method for use in recording information on a medium, comprising:
   applying an initial magnetic field to the medium;
   applying a biasing magnetic field to the medium, the biasing magnetic field being substantially perpendicular to the initial magnetic field; and
   applying a recording magnetic field to the medium while the biasing magnetic field is being applied, the recording magnetic field being substantially opposite in polarity to the initial magnetic field.

2. The method of claim 1, wherein:
   the initial magnetic field orients magnetic grains in the medium towards a first direction;
   the biasing magnetic field orients the magnetic grains towards a second direction that is perpendicular to the first direction; and
   the recording magnetic field orients the magnetic grains towards a third direction that is opposite to the first direction.

3. The method of claim 2, wherein:
   the first direction comprises an X direction in a three-dimensional Cartesian XYZ coordinate system;
   the second direction comprises a Z direction in the three-dimensional Cartesian XYZ coordinate system; and
   the third direction comprises a −X direction in the three-dimensional Cartesian XYZ coordinate system.

4. The method of claim 2, wherein the biasing magnetic field has sufficient strength to orient at least some of the magnetic grains at least 10° towards the Z direction.

5. The method of claim 4, wherein the biasing magnetic field has sufficient strength to orient a majority of the magnetic grains to 45°±10° towards the Z direction.

6. The method of claim 1, further comprising:
   positioning a mask over the medium, the mask having a tooth which shields a portion of the medium underneath the tooth in order to maintain the initial magnetic field in the portion underneath the tooth.

7. The method of claim 6, wherein the information comprises a servo pattern to be recorded on the medium and the tooth defines a portion of the servo pattern.

8. The method of claim 6, wherein the mask is comprised of a ferromagnetic material having teeth that define a servo pattern to be recorded on the medium.

9. The method of claims 8, wherein the ferromagnetic material includes cobalt.

10. The method of claim 1, wherein applying the biasing magnetic field changes a squareness of the medium.

11. The method of claim 1, further comprising:
removing the initial magnetic field before applying the biasing and recording magnetic fields.

12. A magnetic recording process comprising:
applying an initial magnetic field to magnetize a magnetic recording medium;
positioning a ferromagnetic mask over the magnetic recording medium, the ferromagnetic mask having a tooth which shields a portion of the magnetic recording medium in order to maintain the initial magnetic field in the portion;
applying a biasing magnetic field to the magnetic recording medium, the biasing magnetic field being substantially perpendicular to the initial magnetic field; and
applying a recording magnetic field to the magnetic recording medium while applying the biasing magnetic field, the recording magnetic field being substantially opposite in polarity to the initial magnetic field.

13. The magnetic recording process of claim 12, wherein:
the initial magnetic field causes magnetic grains in the magnetic recording medium to orient towards a first direction; and
the recording magnetic field causes magnetic grains in the magnetic recording medium that are not located underneath the tooth to orient towards a second direction that is different from the first direction.

14. The magnetic recording process of claim 13, wherein the second direction has a directional component that is opposite to a directional component the first reaction.

15. The magnetic recording process of claim 13, wherein orienting the magnetic grains in the second direction comprises recording information on the magnetic recording medium.

16. The magnetic recording process of claim 12, wherein applying the biasing magnetic field causes magnetic grains in the magnetic recording medium to orient towards a direction that is perpendicular to a direction of the initial magnetic field and the recording magnetic field.

17. The magnetic recording process of claim 12, wherein:
the initial magnetic field orients magnetic grains in the magnetic recording medium towards an X direction in a three-dimensional Cartesian XYZ coordinate system;
the biasing magnetic field orients magnetic grains in the magnetic recording medium towards a Z direction in the three-dimensional Cartesian XYZ coordinate system; and
the recording magnetic field orients magnetic grains in the magnetic recording medium towards a −X direction in the three-dimensional Cartesian XYZ coordinate system.

18. The magnetic recording process of claim 17, wherein the biasing magnetic field has sufficient strength to orient at least some of the magnetic grains to at least 10° towards the Z direction.

19. The magnetic recording process of claim 18, wherein the biasing magnetic field has sufficient strength to orient a majority of the magnetic grains to 45°±10° towards the Z direction.

20. The magnetic recording process of claim 12, wherein the ferromagnetic mask defines a servo pattern to be recorded on the magnetic recording medium and the tooth defines a portion of the servo pattern.

21. The magnetic recording process of claim 12, wherein the mask is comprised of plural teeth that define a servo pattern to be recorded on the magnetic recording medium.

22. The magnetic recording process of claim 12, wherein the ferromagnetic material includes cobalt.

23. The magnetic recording process of claim 12, wherein applying the biasing magnetic field changes a squareness of the magnetic recording medium.

24. The magnetic recording process of claim 12, further comprising:
removing the initial magnetic field before applying the biasing and recording magnetic fields.

25. A disk drive comprising:
a disk having a plurality of concentric tracks which store data; and
a print head which transfers data to and from the concentric tracks of the disk;
wherein the disk includes servo information that is applied to the disk by:
applying an initial magnetic field to the disk;
applying a biasing magnetic field to the disk, the biasing magnetic field being substantially perpendicular to the initial magnetic field;
applying a recording magnetic field to the disk while the biasing magnetic field is being applied, the recording magnetic field being substantially opposite in polarity to the initial magnetic field.

26. The disk drive of claim 25, wherein:
the initial magnetic field orients magnetic grains in the medium towards a first direction;
the biasing magnetic field orients magnetic grains towards a second direction that is perpendicular to the first direction; and
the recording magnetic field orients the magnetic grains towards a third direction that is opposite to the first direction.

27. The disk drive of claim 25, wherein:
the first direction comprises an X direction in a three-dimensional Cartesian XYZ coordinate system;
the second direction comprises a Z direction in the three-dimensional Cartesian XYZ coordinate system;
the third direction comprises a −X direction in the three-dimensional Cartesian XYZ coordinate system.

28. The disk drive of claim 26, wherein the biasing magnetic field has sufficient strength to orient at least some of the magnetic grains at least 10° towards the Z direction.

29. The disk drive of claim 28, wherein the biasing magnetic field has sufficient strength to orient a majority of the magnetic grains to 45°±10° towards the Z direction.

30. The disk drive of claim 25, wherein the servo information is applied to the disk by further positioning a mask over the medium, the mask having a tooth which shields a portion of the medium underneath the tooth in order to maintain the initial magnetic field in the portion underneath the tooth.

31. The disk drive of claim 30, wherein the tooth defines a portion of the servo pattern.

32. The disk drive of claim 30, wherein the mask is comprised of a ferromagnetic material having teeth that define the servo pattern to be recorded on the medium.

33. The disk drive of claim 32, wherein the ferromagnetic material includes cobalt.

34. The disk drive of claim 25, wherein applying the biasing magnetic field changes a squareness of the medium.

35. The disk drive of claim 25, wherein the initial magnetic field is removed ore the biasing and recording magnetic fields are applied.

* * * * *